(12) United States Patent
Byford

(10) Patent No.: US 6,219,709 B1
(45) Date of Patent: Apr. 17, 2001

(54) SYSTEM AND METHOD FOR ACCESSING DATA FILES IN A COMPUTER NETWORK

(75) Inventor: Derrick John Byford, London (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/848,713

(22) Filed: May 19, 1997

(30) Foreign Application Priority Data

Oct. 30, 1996 (GB) .................................................. 9622599

(51) Int. Cl.⁷ ...................................................... G06F 13/18
(52) U.S. Cl. ............................... 709/227; 348/10; 348/13
(58) Field of Search .......................... 455/6.2, 3.1; 179/4; 364/514; 382/115; 707/104; 395/615; 380/20, 23; 379/207, 96, 226; 348/7, 10, 564, 734, 13, 15, 563; 358/84; 704/550; 709/207, 249, 227; 370/389; 705/36

(56) References Cited

U.S. PATENT DOCUMENTS

| | | | |
|---|---|---|---|
| 4,866,770 | * | 9/1989 | Seth-Smith et al. ................... 380/20 |
| 5,191,410 | * | 3/1993 | McCalley et al. ..................... 358/86 |
| 5,212,475 | | 5/1993 | Thoma ............................ 340/825.16 |
| 5,270,809 | | 12/1993 | Gammie et al. ....................... 358/84 |
| 5,461,667 | * | 10/1995 | Remillard ............................. 379/96 |
| 5,548,834 | | 8/1996 | Suard et al. ....................... 455/276.1 |
| 5,570,295 | * | 10/1996 | Isenberg et al. ..................... 364/514 |
| 5,644,573 | | 7/1997 | Bingham et al. ..................... 370/503 |
| 5,649,285 | * | 7/1997 | Cautley ................................. 455/6.2 |
| 5,734,436 | * | 3/1998 | Abe et al. ............................. 348/564 |
| 5,748,484 | * | 5/1998 | Cannon et al. .................. 364/479.03 |
| 5,761,602 | * | 6/1998 | Wagner et al. ....................... 455/3.1 |
| 5,805,682 | * | 9/1998 | Voit et al. ............................ 379/142 |
| 5,819,238 | * | 10/1998 | Fernholz ................................ 705/36 |
| 5,821,982 | * | 10/1998 | Santilli et al. ......................... 348/13 |
| 5,844,597 | * | 12/1998 | Kettler et al. ......................... 348/15 |
| 5,890,071 | | 3/1999 | Shimanuki ........................... 704/550 |
| 5,914,756 | * | 6/1999 | Maeda et al. ........................ 348/563 |
| 5,936,661 | * | 8/1999 | Trew ..................................... 348/13 |
| 5,973,747 | * | 10/1999 | Goreta ................................. 348/460 |
| 5,978,013 | * | 11/1999 | Jones et al. ........................... 348/10 |
| 5,982,445 | * | 11/1999 | Eyer et al. ........................... 348/461 |
| 5,987,029 | * | 11/1999 | Kotani et al. ........................ 370/389 |

FOREIGN PATENT DOCUMENTS

| | | | |
|---|---|---|---|
| 0 630 156 | 12/1994 | (EP) | . |
| 630156 | 12/1994 | (EP) | .............................. H04N/7/087 |
| 723369 | 7/1996 | (EP) | ................................ H04N/7/00 |

OTHER PUBLICATIONS

Douglas C McArthur, 'World Wide Web & HTML', pp. 18–26, Dr Dobb's Journal, Dec. 1994.
Siu et al, Rebroadcasting of real time teletext data . IEEE pp. 131–135, Apr. 1993.*

* cited by examiner

Primary Examiner—Robert B. Harrell
Assistant Examiner—Thong Vu
(74) Attorney, Agent, or Firm—A. Bruce Clay; Myers, Bigel, Sibley & Sajovec, P.A.

(57) ABSTRACT

A system receives a call from a user via a telephone in which the user requests data files from a computer network. A Teletext page is allocated to the user by the system and identified by a number. The system generates a menu in the allocated Teletext page and includes it in a broadcast television signal from which the user makes a selection by pushing a number on the telephone keypad. The number identifies a data file on the computer network. The system writes the information from the requested file to the Teletext page included in the television broadcast signal.

12 Claims, 4 Drawing Sheets

SYSTEM AND METHOD FOR ACCESSING DATA FILES IN A COMPUTER NETWORK

DESCRIPTION

FIELD OF THE INVENTION

The present invention relates to a system and method for accessing data files in a computer network.

BACKGROUND OF THE INVENTION

In recent years, there has been explosive growth in the Internet, and in particular of the WorldWide Web (WWW), which is one of the facilities provided via the Internet. The WWW comprises many pages or files of information, distributed across many different servers. Each page is identified by an individual address or "Universal Resource Locator (URL)". Each URL denotes both a server machine, and a particular file or page on that machine. There may be many pages or URLs resident on a single server.

Typically, to utilise the WWW, a user runs a computer program called a Web browser on a client computer system such as a personal computer. Examples of widely available Web browsers include the "WebExplorer" Web browser provided by International Business Machines Corporation in the OS/2 Operating System software, or the "Navigator" Web browser available from Netscape Communications Corporation. The user interacts with the Web browser to select a particular URL. The interaction causes the browser to send a request for the page or file identified in selected URL to the server identified in the selected URL. Typically, the server responds to the request by retrieving the requested page, and transmitting the data for that page back to the requesting client. The client-server interaction is usually performed in accordance with a protocol called the hypertext transfer protocol ("http"). The page received by the client is then displayed to the user on a display screen of the client. The client may also cause the server to launch an application, for example to search for WWW pages relating to particular topics.

WWW pages are typically formatted in accordance with a computer programming language known as hypertext markup language ("html"). Thus a typical WWW page includes text together with embedded formatting commands, referred to as tags, that can be employed to control for example font style, font size, lay-out etc. The Web browser parses the HTML script in order to display the text in accordance with the specified format. In addition, an html page also contain a reference, in terms of another URL, to a portion of multimedia data such as an image, video segment, or audio file. The Web Browser responds to such a reference by retrieving and displaying or playing the multimedia data. Alternatively, the multimedia data may reside on its own WWW page, without surrounding html text.

Most WWW pages also contain one or more references to other WWW pages, which need not reside on the same server as the original page. Such references may be activated by the user selecting particular locations on the screen, typically by clicking a mouse control button. These references or locations are known as hyperlinks, and are typically flagged by the Web browser in a particular manner. For example, any text associated with a hyperlink may be displayed in a different colour. If a user selects the hyperlinked text, then the referenced page is retrieved and replaces the currently displayed page.

Further information about html and the WWW can be found in "World Wide Web and HTML" by Douglas McArthur p18–26 in Dr Dobbs Journal, December 1994, and in "The HTML SourceBook" by Ian Graham, John Wiley, New York, 1995.

Conventionally, to access WWW pages via the Internet, a user has needed access to relatively specialised and expensive hardware such a personal computer fitted with a modem communications link and a WWW browser software package. More recently, there have become available a variety of so-called "set-top boxes" each for linking a domestic television receiver to the WWW. Examples of such step top boxes includes the Internet TV Terminal available from Phillips/Magnavox and the WebTV Internet Terminal available from Sony Corporation. A set-top box typically includes a modem communication link connectable to the WWW via a subscriber telephone line and a video output connectable to a domestic television receiver for displaying WWW pages down-loaded from the WWW via the modem link. It would be desirable to enable users to access the Internet access with no, or at most the bare minimum of, additional specialist hardware.

SUMMARY OF THE INVENTION

In accordance with the present invention, there is now provided a system for accessing data files in a computer network, the system comprising: means for receiving a call from a telephone; means for allocating a teletext page in a television signal in response to the call; and, means for writing data from one or more of the data files to the allocated teletext page.

This advantageously enables a user to select and view data files available via a computer network such as the Internet via a domestic television receiver capable of receiving teletext and a domestic telephone hand-set.

The system preferably comprises means for sending a message identifying the allocated teletext page to the telephone.

In preferred embodiments of the present invention, the system comprises means for generating a menu of data files available via the computer network, each data file having a different identifier specified in the menu; means for writing the menu to the allocated teletext page; means for receiving the identifier corresponding to a selected data file from the telephone; means for retrieving the selected data file from the computer network; and, means for writing data from the selected data file to the allocated teletext page.

The system preferably comprises means for releasing the allocated teletext page for re-allocation in response to termination of the telephone call.

In preferred embodiments of the present invention, there is provided means for generating successive menus of data files in response to successive selections received via the telephone.

In particularly preferred embodiments of the present invention, each data file comprises a World Wide Web page.

In some embodiments of the present invention the call receiving means and the identifier receiving means may be responsive to a tone dialling signal. In other embodiments of the present invention however, the call receiving means and the identifier receiving means each comprise a voice recognition sub-system.

In particularly preferred embodiments of the present invention, there is provided means for detecting if a teletext page is available for allocation to an incoming call and, in the event that no teletext pages are available for allocation, for returning the incoming call when a teletext page is released for re-allocation.

Examples of the present invention may also include means for sending a facsimile message containing data from the selected data file.

Viewing the present invention from another aspect there is provided a method for accessing data files in a computer network, the method comprising: receiving a call from a telephone; allocating a teletext page in a broadcast television signal in response to the call; sending a message identifying the allocating teletext page to the telephone; generating a menu of data files available via the computer network, each data file having a different identifier specified in the menu; writing the menu to the allocated teletext page; receiving the identifier corresponding to a selected data file from the telephone; retrieving the selected data file from the computer network; and, writing data from the selected data file to the allocated teletext page.

Viewing the present invention from yet another aspect, there is provided a server computer system for accessing data files in a computer network, the system comprising: a call handler for receiving a call from a telephone, for allocating a teletext page in a broadcast television signal in response to the call, for sending a message identifying the allocating teletext page to the telephone; a browser connected to the call handler for generating a menu of data files available via the computer network, each data file having a different identifier specified in the menu; means for writing the menu to the allocated teletext page; the call handler being adapted to receive the identifier corresponding to a selected data file from the telephone; the browser being adapted to retrieve the selected data file from the network; and a page convertor connected to the browser for writing data from the selected data file to the allocated teletext page.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
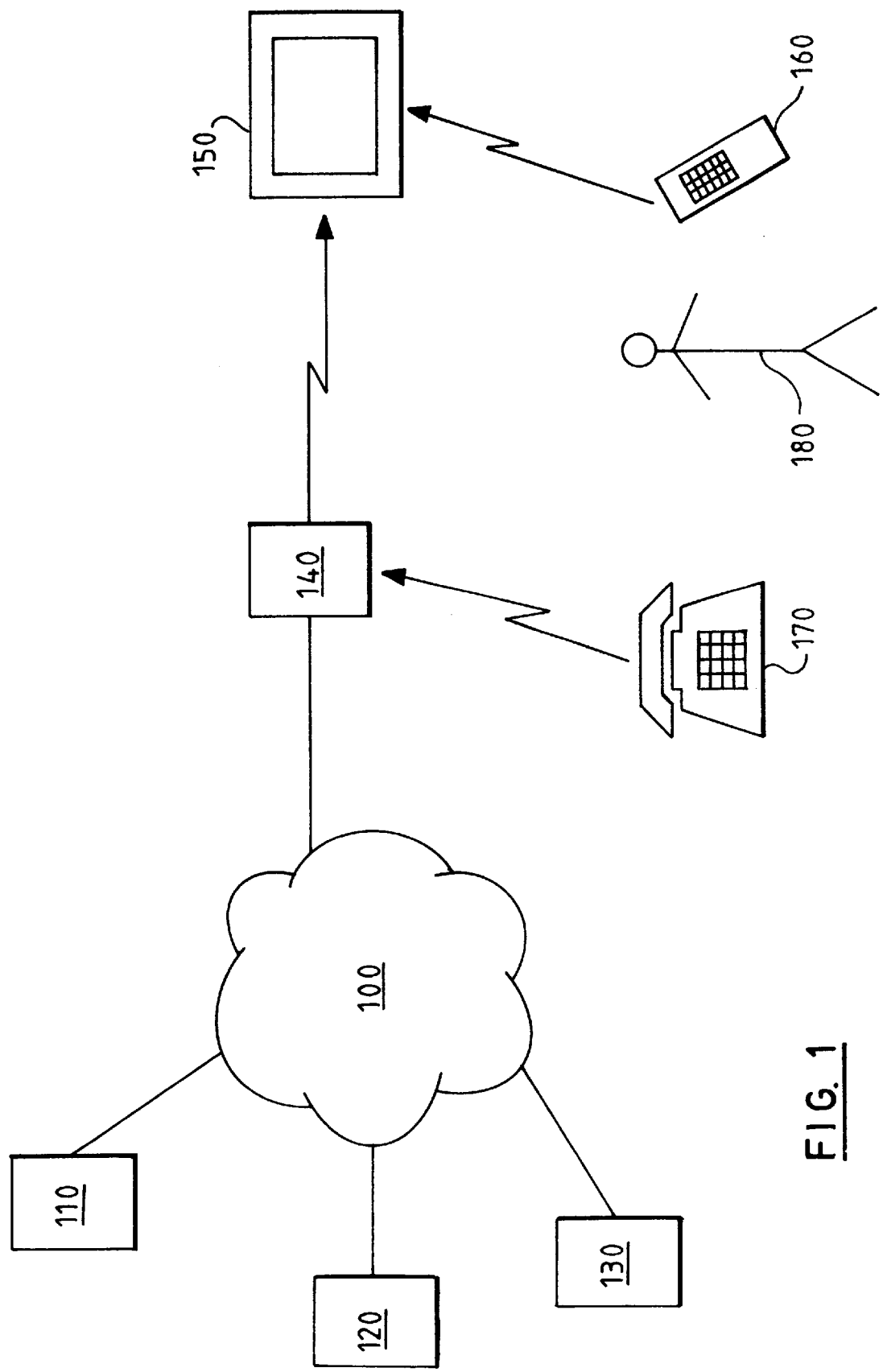
FIG. 1 is a block diagram of a data communications network.

Referring first to FIG. 1, a data communication network embodying the present invention comprises the Internet 100. A plurality of WWW server computer systems 110–130 are connected to Internet 100. Also connected to Internet 100 is a teletext server 140. Teletext server 140 is configured to receive an input from a subscriber telephone 170 with tone dialling capability. Teletext server 120 also provides a teletext output to a broadcast television receiver 150 capable of receiving teletext pages. Television receiver 150 can be instructed by user 180 to access different teletext pages via a remote control device 160.

Figure 2:
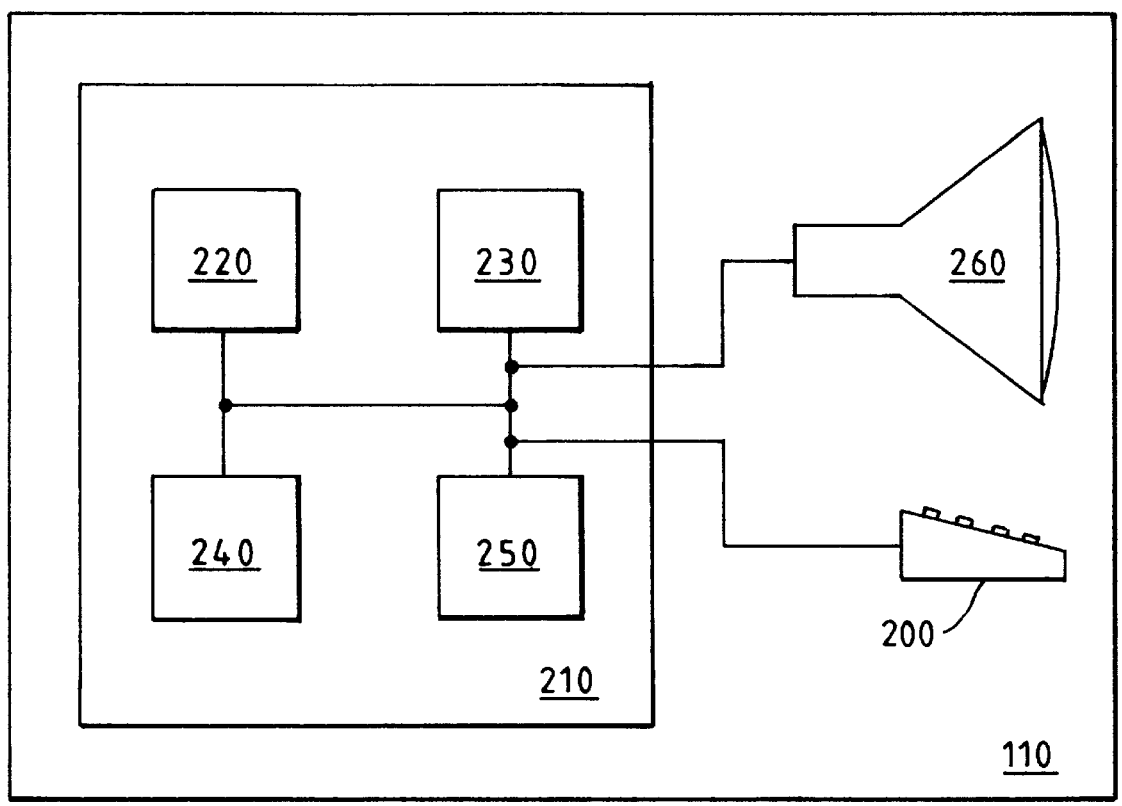
FIG. 2 is a block diagram of a server computer of the data communications network.

Referring now to FIG. 2, each WWW server 110–130 includes a keyboard 200 attached to a system unit 210 including a main CPU 220, system RAM 230, system ROM 240, and mass storage capability 250, typically in the form of multiple magnetic disk drives constituted in a RAID (redundant array of independent disks) arrangement. Each WWW server 110–130 has stored in its mass storage 250 at least one WWW page. Each WWW server 110–130 also includes a display 260 enabling direct interaction between the WWW server 110–130 and an administrator. Each WWW server 110–130 may also include other storage devices such as diskette drives and CD ROM drives. In some embodiments of the present invention, the display 260 and keyboard 200 of each WWW server 110–130 provided via an intermediate personal computer.

Figure 3:
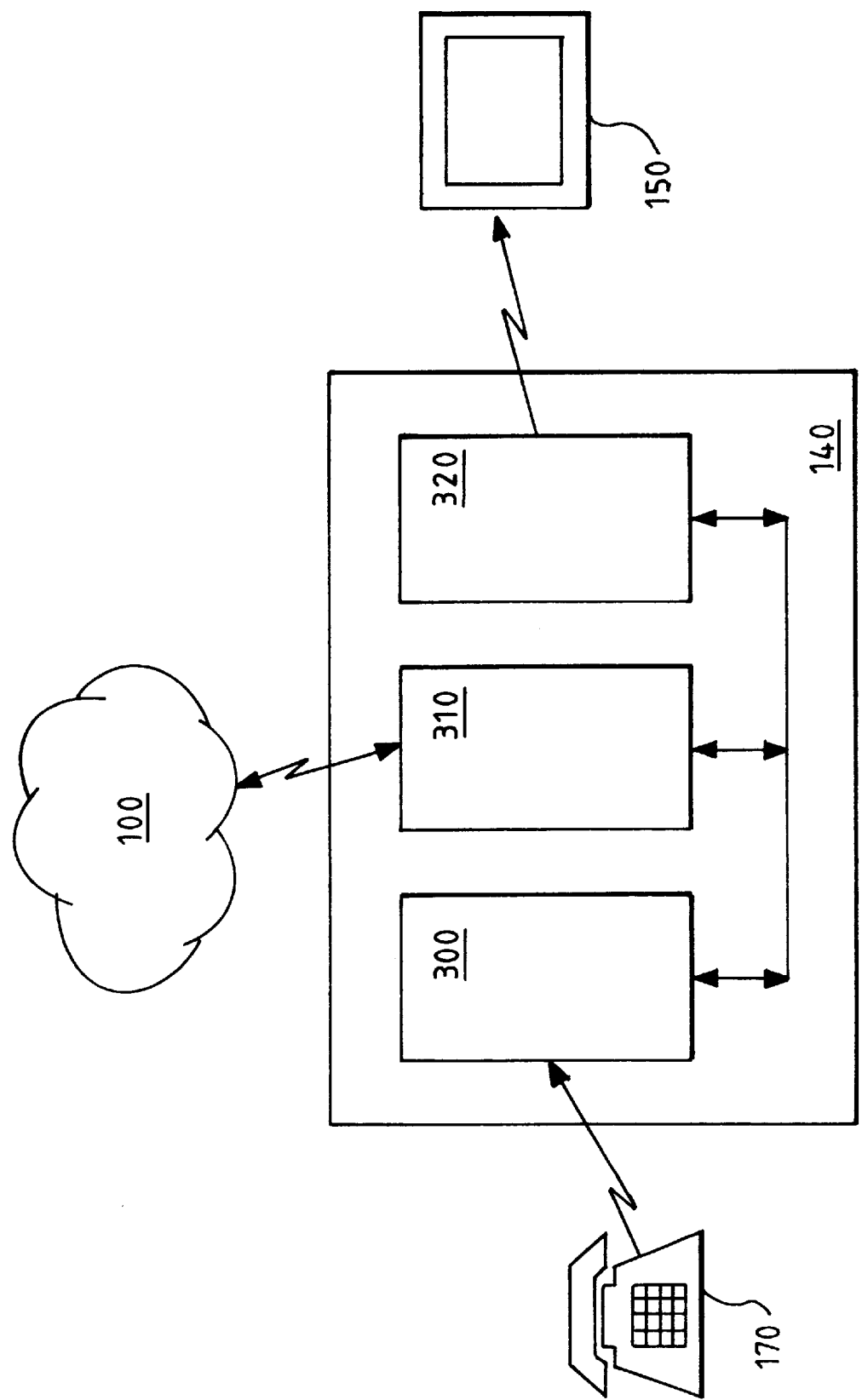
FIG. 3 is a block diagram of a teletext server of the data communications network; and, FIG. 4 is another block diagram of the teletext server presented in the form of a flow chart.

Referring now to FIG. 3, teletext server 140 comprises a telephone call handler 300, a web browser 310, and a WWW page convertor 320 all interconnected to each other. In some embodiments of the present invention, telephone handler 300, web browser 310, and WWW page convertor 320 may be integrated into a single server computer system on the kind hereinbefore described with reference to FIG. 2. However, in other embodiments of the present invention, teletext server 140 may comprise separate computer systems for implementing each of call handler 300, web browser 310, and page convertor 320. Call handler receives incoming telephones calls made to one or more pre-assigned telephone numbers. The preassigned telephone numbers may, for example, be premium rate telephone numbers. Web browser 310 is connected to the Internet for accessing WWW pages. WWW page convertor 320 is connected to a teletext input of a broadcast television signal generator (not shown).

Figure 4:
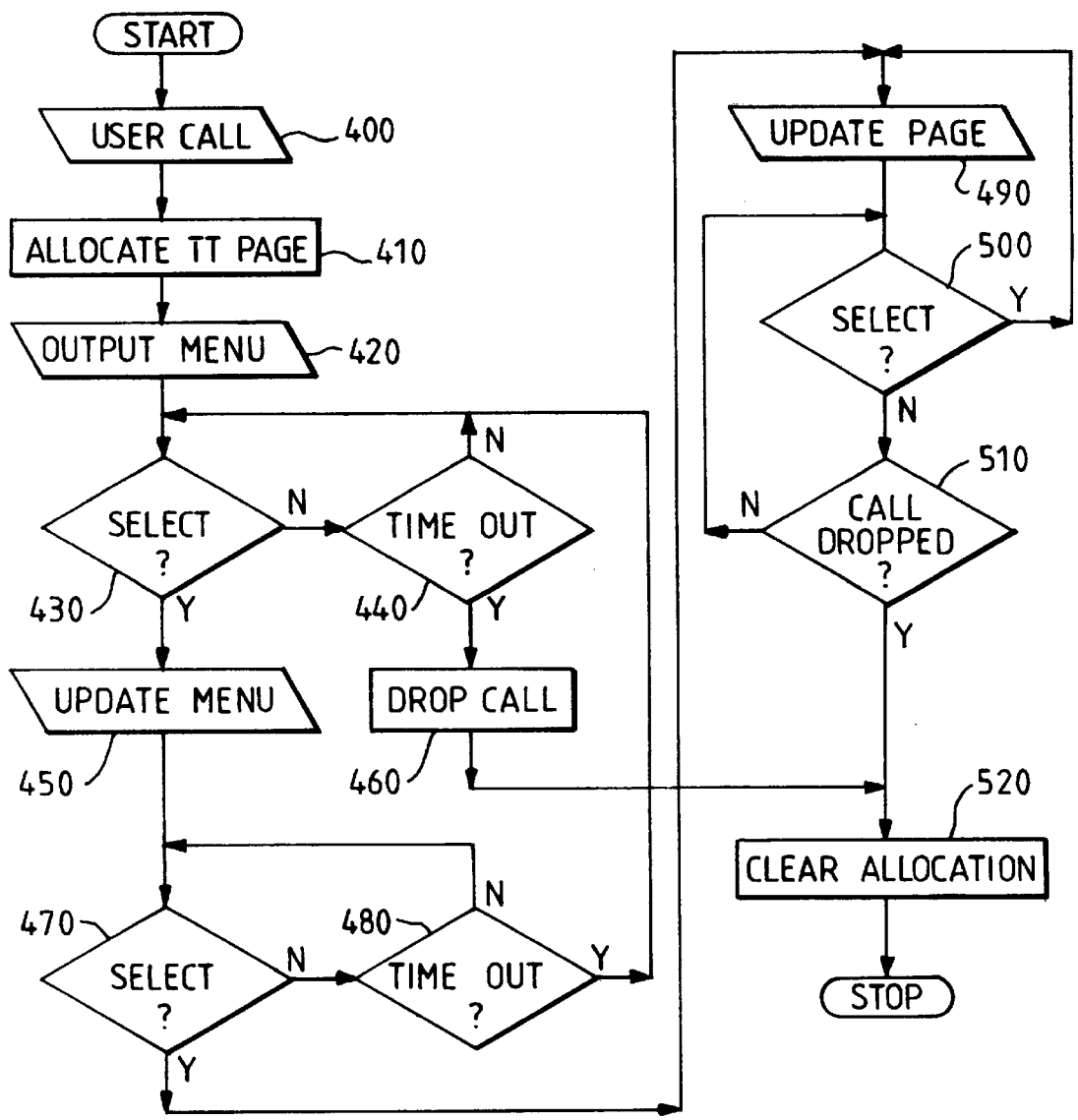

Referring now to FIG. 4, to display information from a WWW page on television receiver 150, user 180 places a telephone call from tone phone 170 to a telephone number associated with call handler 300 of teletext server 140 as signified by input block 400. At block 410, call handler 300 responds to the incoming call by allocating a currently unused teletext page to the user. Call handler 300 automatically generates an audio message for indicating the number of the allocated teletext page to the user.

Web browser 310 provides an initial subject menu to page convertor 320. At block 420, page convertor 320 inserts the initial subject menu into the allocated teletext page. The teletext page including the menu is inserted in the broadcast television signal. The teletext page is recovered from broadcast television signal at television receiver 150, and the subject menu is displayed on the screen of television receiver 150. User 180 accesses the allocated teletext page and hence the subject menu by keying the number supplied via telephone 170 on remote control device 160. Television receiver displays the allocated teletext page in response to the corresponding output of remote control device 160. Each item on the subject menu corresponds to a different number.

User 180 selects, at block 430, a particular item from the subject menu by keying the corresponding number into telephone 170. Call handler 300 detects the number keyed into telephone 170 and passes it to web browser 310. At block 450, a search engine of web browser 310 scans internet 100 for WWW pages corresponding to the subject selected by the user. Web browser 310 then generates a WWW menu of WWW pages identified by the search engine. Each WWW page listed in the WWW menu is accompanied by a brief description of the content thereof, and each WWW page listed in the WWW menu is, once again associated with a different number. Web browser 310 compiles a look up table mapping each number to the URL of the corresponding WWW page. The WWW menu is passed by web browser 310 to page convertor 320 for inclusion in the teletext page allocated to user 180.

If user 180 fails to make a selection from the initial menu during a predetermined time out period monitored at block 440 then, at block 460, the telephone call connection between telephone 170 and call handler 300 is terminated by call handler 300. At block 520, call handler 300 releases the allocated teletext page for reallocation to a new user. If however selection from the initial menu is made as hereinbefore described, user 180 is presented with the WWW menu on the screen of television receiver 150. At block 470, user selects a WWW page of interest from WWW menu by keying the corresponding number into telephone 170. Call handler 300 detects the entered number and sends it to web browser 310. Web browser 310 then retrieves the URL corresponding to the entered number from the look up table and the WWW page corresponding to the URL from Internet 100. The retrieved WWW page is sent by web browser 310 to page convertor 320. At block 490, the WWW page convertor 320 converts the WWW page supplied by web browser to a form suitable for inclusion in the allocated teletext page and updates the allocated the teletext page to include the converted WWW page for presentation to user 180 on the screen of television receiver 150.

If user 180 fails to select a WWW page within a predetermined time out period then, at block 480, user 180 is returned to the initial menu for subject selection at block 430.

Each hypertext link contained in the retrieved WWW page, if any, is converted by page convertor 320 into a number for inclusion in the allocated teletext page. The WWW page convertor 320 instructs the web browser 310 to update the look-up table to include the number corresponding to each hypertext link. At block 500, user 180 can select the hypertext link by keying the corresponding number displayed on the allocated teletext page into telephone 170. The number thus entered is detected by call handler 300 and sent to web browser 310. In turn, web browser 310 retrieves the URL corresponding to the entered number from the look-up table and retrieves the corresponding linked WWW page from Internet 100. The linked WWW page retrieved by web browser 310 is converted to teletext format by page convertor 320 and included in the allocated teletext page for display to user 180.

At block 510, user 180 can terminate the Internet session simply by terminating the call set up between telephone 170 and call handler 300. As mentioned earlier, on detection of termination of the call, at block 520 call handler releases the allocated teletext page for reallocation to a new user.

In the embodiment of the present invention hereinbefore described two tiers of menus are provided, with possible selections reverting to those of the initial menu in the event that no selection is made from the WWW menu within a predetermined time interval. It will however appreciated that, in other embodiments of the present invention, more than two tiers of menus may be provided with possible selections reverting to those of earlier menus in the event of no selection within a predetermined period. Equally, in some embodiments of the present invention, only a single menu of available WWW pages may provided.

In a modification of the embodiment of the present invention hereinbefore described, call handler 300 may include a voice recognition sub-system for permitting WWW page selection by voice input from telephone 170.

In another modification of the embodiment of the present invention hereinbefore described, call handler 300 may include a facsimile sub-system for providing a user having access to a facsimile receiver with a printed output of a selected WWW page.

In yet another modification of the embodiment of the present invention hereinbefore described, call handler 300 may include a "call-back on busy" sub-system for returning a call to telephone 170 when a teletext page is free for allocation in the event of an initial call from telephone 170 being made at a time when all teletext pages available to server 140 are already allocated to other users.

In particularly preferred embodiments of the present invention, at least one of the teletext pages available to server 130 is reserved by call handler 300 for providing on-screen help to user 180.

In summary then, a preferred embodiment of the present invention has been hereinbefore described in which there is provided a system for accessing data files in a computer network. The system comprises means for receiving a call from a telephone, means for allocating a teletext page in a television signal in response to the call, and means for writing data from one or more of the data files to the allocated teletext page.

What is claimed is:

1. A system for accessing network World Wide Web page data files in a computer network, the system comprising:
    means for receiving a call from a telephone;
    means for allocating a teletext page in a broadcast television signal in response to the call;
    means for writing data from one or more of the data files to the allocated teletext page, wherein the data files comprise World Wide Web pages; and
    means for sending a voice message identifying the allocated teletext page to the telephone.

2. A system as claimed in claim 1, comprising means for generating a menu of data files available via the computer network, each data file having a different identifier specified in the menu; means for writing the menu to the allocated teletext page; means for receiving the identifier corresponding to a selected data file from the telephone; means for retrieving the selected data file from the computer network; and, means for writing data from the selected data file to the allocated teletext page.

3. A system as claimed in claim 2, comprising means for generating successive menus of data files in response to successive selections received via the telephone.

4. A system as claimed in claim 1, comprising means for releasing the allocated teletext page for re-allocation in response to termination of the telephone call.

5. A system as claimed in claim 2, wherein the call receiving means and the identifier receiving means are responsive to a tone dial signal.

6. A system as claimed in claim 2 wherein the call receiving means and the identifier receiving means each comprise a voice recognition sub-system.

7. A system as claimed in claim 1, comprising means for detecting if a teletext page is available for allocation to an incoming call and, in the event that no teletext pages are available for allocation, for returning the incoming call when a teletext page is released for reallocation.

8. A system as claimed in claim 1, comprising means for sending a facsimile message containing data from the selected data file.

9. A method for accessing World Wide Web page data files in a computer network, the method comprising:
    receiving a call from a telephone;
    allocating a teletext page in a broadcast television signal in response to the call;
    writing data from one or more of the data files to the allocated teletext page, wherein the data files comprise World Wide Web pages; and
    sending a voice message identifying the allocated teletext page to the telephone.

10. A method as claimed in claim 9, comprising: generating a menu of data files available via the computer network, each data file having a different identifier specified in the menu; writing the menu to the allocated teletext page; receiving the identifier corresponding to a selected data file from the telephone; retrieving the selected data file from the computer network; and, writing data from the selected data file to the allocated teletext page.

11. A server computer system for accessing World Wide Web page data files in a computer network, the system comprising:
- a call handler for receiving a call from a telephone and for allocating a teletext page in
- a broadcast television signal in response to the call;
- a browser for accessing one or more data files from the network; and
- a World Wide Web page convertor for writing data from said one or more data files to the allocated teletext page, wherein the call handler sends a voice message to the telephone that identifies the allocated teletext page in the television broadcast signal, wherein the data files comprise World Wide Web pages.

12. A server as claimed in claim 11, wherein the browser is adapted to generate a menu of data files available via the computer network, each data file having a different identifier specified in the menu; the page convertor is adapted to write the menu to the allocated teletext page; the call handler is adapted to receive the identifier corresponding to a selected data file from the telephone; the browser is adapted to retrieve the selected data file from the network; and the page convertor is adapted to write data from the selected data file to the allocated teletext page.

* * * * *